(No Model.)

C. HENKEL.
HOOK.

No. 542,255. Patented July 9, 1895.

Witnesses

Inventor
Charles Henkel

UNITED STATES PATENT OFFICE.

CHARLES HENKEL, OF BRATTLEBOROUGH, VERMONT.

HOOK.

SPECIFICATION forming part of Letters Patent No. 542,255, dated July 9, 1895.

Application filed March 18, 1895. Serial No. 542,118. (No model.)

*To all whom it may concern:*

Be it known that I, CHARLES HENKEL, of Brattleborough, in the county of Windham and State of Vermont, have invented a new and Improved Hook, of which the following is a specification, reference being had to the accompanying drawings, wherein—

Figure 1:
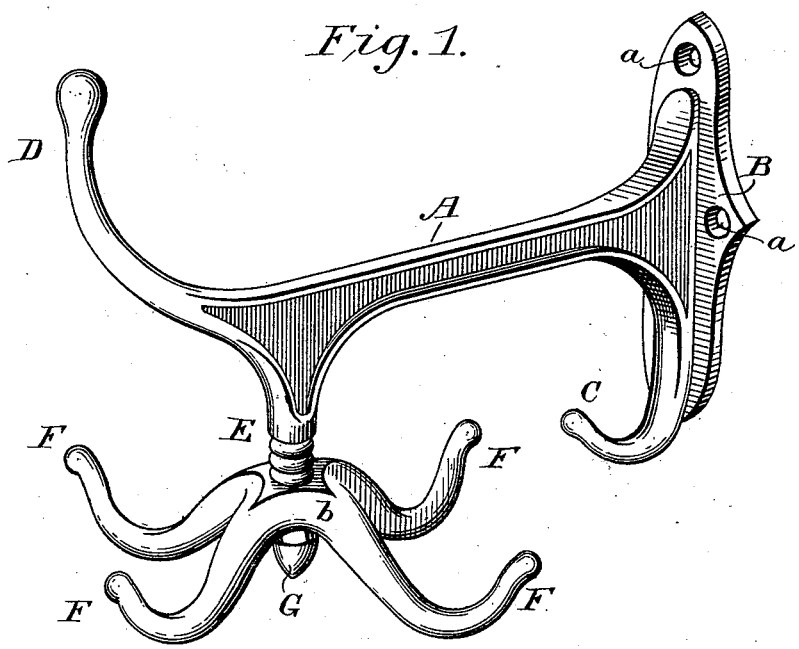
Figure 2:
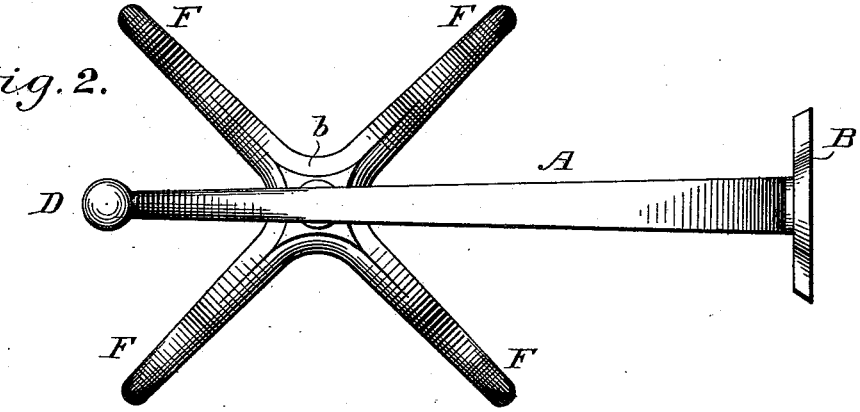
Figure 3:
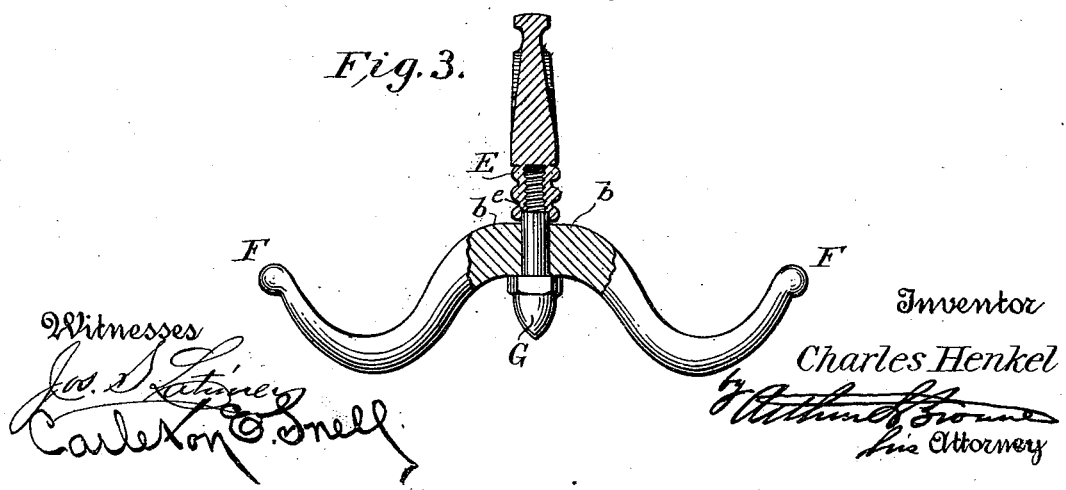

Figure 1 is a perspective view of the improved hook. Fig. 2 is a plan view thereof. Fig. 3 is a vertical cross-section through the axis of the rotary portion of the hook.

A is the horizontally-extending arm of a bracket having an attaching-plate B for attachment to any suitable support. Beneath the arm A and adjacent to the attaching-plate B the bracket is provided with a depending hook C. At its forward upper end the bracket-arm A is provided with an upwardly-projecting hook D. Beneath its forward end the bracket-arm A is provided with a depending stem E, which supports a plurality of hooks F F, which extend horizontally and are arranged symmetrically with reference to said stem and are equally spaced. Preferably the hooks F F are integrally connected with each other. The hooks F F are rotatively connected with the stem E. To this end the hub *b* of the hooks F F is swiveled upon a pintle G, which is screwed into a socket in stem E, a shoulder *e* of the pintle seating tightly in said socket, so as to prevent the accidental unscrewing of said pintle when said hooks F F are rotated. The rotation of the hooks F F enables articles hung thereupon to be easily reached.

The bracket A, plate B, hooks C D, and stem E are all made in one piece of metal, as likewise are the hooks F F, with their hub *b*.

This improved hook is ornamental in appearance and permits hanging of a number of articles in a compact manner. It is especially adapted for use in steamer state-rooms, railway-cars, display-windows of stores, barber-shops, hotel toilet and cloak rooms, and in the hallways, closets, and wardrobes of private houses and offices. I do not, however, limit the use of the hook to these specified places.

I claim as my invention—

1. The arm A, having attaching plate B, upwardly-extending hook D, and depending stem E, at its outer end, and a plurality of horizontally extending and symmetrically disposed hooks F, F, rotatively supported by said depending stem E, substantially as set forth.

2. The arm A, having attaching plate B, depending hook C adjacent to said plate, upwardly-extending hook D at its outer end, depending stem E, near its outer end, and pintle G, screwing into a socket in said stem, and having a locking shoulder *e* fitting in said socket, and a plurality of horizontally-extending and symmetrically-disposed hooks F, F, rotating upon said pintle G, substantially as set forth.

In witness whereof I have hereunto signed my name in the presence of two subscribing witnesses.

CHARLES HENKEL.

Witnesses:
CARL W. HENKEL,
A. W. CHILDS.